United States Patent [19]
Calvani et al.

[11] Patent Number: 4,759,624
[45] Date of Patent: Jul. 26, 1988

[54] METHOD OF AND APPARATUS FOR MEASURING POLARIZATION BEAT-LENGTH IN HIGHLY-BIREFRINGENT SINGLE-MODE OPTICAL FIBERS

[75] Inventors: Riccardo Calvani, Pino Torinese; Gianni Coppa, Torino, both of Italy

[73] Assignee: CSELT - Centro Studi e Laboratori Telecomunicazioni S.p.A., Torino, Italy

[21] Appl. No.: 58,333

[22] Filed: Jun. 4, 1987

[30] Foreign Application Priority Data

Jun. 17, 1986 [IT] Italy .................. 67496 A/86

[51] Int. Cl.$^4$ ............... G01N 21/84; G01N 21/21
[52] U.S. Cl. ....................................... 356/73.1
[58] Field of Search ............................ 356/73.1

[56] References Cited
PUBLICATIONS

R. Calvani et al., "A Fast Heterodyne Interferometer...", CSELT Technical reports, vol. XIII, No. 5, Oct. 1985 – pp. 313–316.
T. Takada et al., "Precision Measurement of modal birefringence..." Applied Optics, vol. 24, No. 24, Dec. 15, 1984, pp. 4387–4391.

Primary Examiner—Vincent P. McGraw
Attorney, Agent, or Firm—Herbert Dubno

[57] ABSTRACT

A constant force perpendicular to the fiber axis is applied to the fiber and is displaced step by step along the fiber axis. The state of polarization of a radiation outgoing from the fiber is determined at each step and the beat-length values are obtained from both the amplitude ratio and the phase difference between the components, along the two birefringence axes, of the electrical field associated with a radiation launched into the fiber.

11 Claims, 2 Drawing Sheets

METHOD OF AND APPARATUS FOR MEASURING POLARIZATION BEAT-LENGTH IN HIGHLY-BIREFRINGENT SINGLE-MODE OPTICAL FIBERS

FIELD OF THE INVENTION

The present invention relates to an optical fibre characterization method and, more particularly, to a method of and an apparatus for measuring polarization beat-length in highly-birefringent single-mode optical-fibres.

BACKGROUND OF THE INVENTION

An optical fiber is known to exhibit a birefringence due to the refractive-index difference along two orthogonal axes (fiber birefringence axes). This difference arises from both the practical impossibility of manufacturing a perfectly circular fiber and from imperfections caused by the manufacturing process.

Birefringence causes a variation in the state of polarization of a radiation propagating along the fiber. Such a phenomenon is characterized by a well-defined periodicity. The distance between two subsequent points of the fiber where the propagating radiation presents the same state of polarization is called the beat length, and it is the distance at which the difference of phase $\phi_{x,y}$ between the components, along the two birefringence axes, of the electrical field associated with the radiation, has a value $2\pi$.

As known, such a phase difference depends on the difference between the refractive indice along the two axes according to relation $$\phi_{x,y} = \frac{2\pi}{\lambda}(n_x - n_y)Z \quad (1)$$

where $\lambda$ is the radiation wavelength, $Z$ is the distance covered within the fiber and $n_x$, $n_y$ are the two refractive indices.

Polarization maintenance is fundamental when using single-mode optical fibers as sensors. Highly-birefringent fibers are used in these applications, these fibers are obtained by imposing the birefringence during manufacturing. A strong anisotropy derives from non-circular core shape and/or from permanent mechanical stresses induced on the core itself. Such fibers have a beat length of the order of some millimeters. Accurate knowledge of the beat length is indispensable for correctly dimensioning fiber lengths to be used in such applications.

Various methods for measuring polarization beat length in highly-birefringent optical fibers are known. For instance, "Precision measurement of modal birefringence of highly-birefringent fibres by periodic lateral force" by K. Takada, J. Noda and R. Ulrich, Applied Optics, Vol. 24, No. 24, 15 Dec. 1985, pages 4387 ff., describes a method where a transverse force is applied to the fiber according to one of the birefringence axes, this force is modulated (varied at audio frequency by a loudspeaker, the force application point and the modulating means are displaced along the fiber and the ratio between the components along the two birefringence axes, of the intensity of a radiation injected into the fibre is measured. The beat length is the length of the fiber over the displacement at which this ratio recovers the same value.

This method has a number of disadvantages: measurement conditions are to be such that only one of the fundamental modes is excited and coupling coefficient of the two modes is to be very small; since the signal to be measured is proportional to this coefficient, noises of even low intensity can seriously affect the measurement precision; fiber birefringence axes must be previously identified, and this lengthens measurement time; and the presence, in one device displaceable along the fiber, of means which apply a force to modify the state of polarization and means for periodically modifying this force to generate a reference for the measurement instruments makes it difficult to accurately control force intensity and direction, and this also is detrimental to measurement precision.

SUMMARY OF THE INVENTION

These disadvantages are overcome by the method and apparatus of the present invention, which make an interferometric polarization analysis instead of a radiometric one, and hence do not present problems due to low signal level, apply a force which is constant and hence easy to control in direction and intensity and do not require a previous determination of fiber birefringence axes.

The present invention provides a method of measuring beat length in highly-birefringent single-mode fibers, wherein a polarized radiation is launched or injected into the fiber, a force is applied to the fibre perpendicularly to the fiber axis, the point of application of the force is displaced along the fiber and the beat value is obtained by measurements of the signal outgoing from the fiber. According to the invention a constant-intensity force is applied to the fiber, the polarization of the output signal is analyzed and the beat length is derived from the values, as a function of the force application point, of the ratio ($R(Z)$) between the amplitudes of the components along the two birefringence axes of the electric field associated with the radiation launched into the fiber, and of the relative phase ($\phi_{x,y}(Z)$) between the two components. Beat length is represented by the period of the function which expresses the ratio of said amplitudes versus the displacement of the force application point and by the distance between the two points where the relative phase varies by $2\pi$, respectively.

The apparatus according to the invention comprises a source of polarized radiation, stressing means for exerting onto the fiber a force whose application point is displaced along the fiber axis, and means for analyzing the fiber output signal. According to this aspect of the invention the stressing means apply a constant force on the fiber and the output-signal analyzing means comprises a polarimeter associated with computing means apt to obtain the beat-length value from both the ratio between the amplitudes of the components, along two axes of birefringence of the fiber, of the electrical field associated with the radiation launched into the fiber, and from the relative phase of the two components.

BRIEF DESCRIPTION OF THE DRAWING

The invention will now be described with reference to the accompanying drawing, wherein.

SPECIFIC DESCRIPTION

Figure 1:
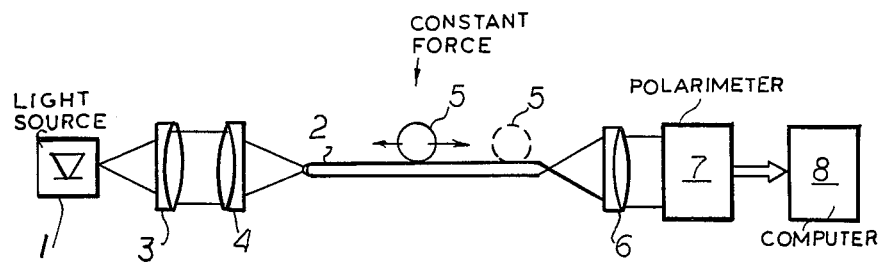
FIG. 1 is a schematic representation of the measuring apparatus.

In FIG. 1, the apparatus comprises a quasi-monochromatic light source 1, e.g. a semiconductor laser. The radiation emitted is collimated and focused on the input face of fiber 2 under test, through a suitable optical system schematized by lenses 3, 4. The fiber, as mentioned, is a highly-birefringent (or polarization-maintaining) single-mode fiber, i.e. a fibre with short beat length (a few millimeters). The fiber length used for the measurement must be such that propagation time difference between the two modes is less than source coherence time.

A mechanical stressing device, schematized by roller 5, applies a constant force on a fiber zone whose linear size, along the fiber axis, is very small as compared to beat length (e.g. of the order of 1/100), and displaces the force application point along the fiber axis. This system will be described in detail with reference to FIG. 2.

The light outgoing from fiber 2 is sent, through a suitable optical system schematized by lens 6, to a polarimeter 7 supplying the values of phase difference $\phi$ and ratio R between the amplitudes Ex, Ey of the two components, along the two birefringence axes, of the electrical field associated with the radiation launched into the fiber. Advantageously, polarimeter 7 is an interferometric polarimeter, e.g. of the type described by R. Calvani, R. Caponi, F. Cisternino in the paper entitled: "A fast heterodyne interferometer for real-time fibre polarimetry", presented at IOOC-ECOC '85, Venice, 1-4 Oct. 1985.

A computing device 8 obtains the values of beat length $L_B$ from both the amplitude ratio and the relative phase, as will be described hereinafter.

Figure 2:
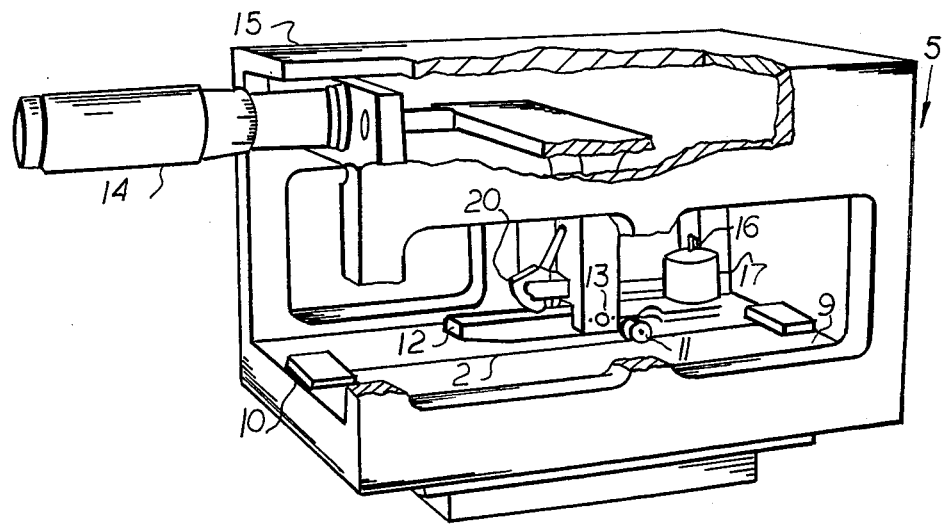
FIG. 2 is a perspective view of a possible example of the means applying the force to the fiber and displacing the force application point.

The means for applying a force on the fiber and displacing the application point is shown in FIG. 2.

A base plate 9 has a V-shaped groove housing fiber 2 and having such a depth as to let nearly half the fiber jut out.

A roller 11 with horizontal axis perpendicular to the fiber axis can roll over fiber 2. Roller 11 is carried by a lever 12 pivotally mounted on a frame 13, which can be displaced step by step along base plate 9 in a controlled way, e.g. upon command of a micrometric screw 14 carried by a plate 15 integral with base 9. To simplify the drawing, the means allowing the control of the linearity of displacement of frame 13 is not shown.

Lever 12 is equipped with means, represented by pin 16, for mounting a predetermined weight 17 which is to cause deformation and hence birefringence variation of fiber 2. A cam member 20 allows lever 12 to be raised, even when loaded, for the insertion of fiber 2.

The relative positions of pin 16, of the axis of roller 11 and of the pivotal axis of lever 12 are advantageously chosen so that the force applied by roller 11 on the fiber is a multiple of the weight applied to the lever, e.g. triple. In this way a fiber deformation, and hence a birefringence variation, of desired magnitude can be obtained without using considerable weights.

Roller diameter is chosen so that the deformation affects a zone of fiber 2 whose size along the fiber axis is negligible with respect to beat-length; e.g., if the roller diameter is about 1 cm, an elliptical deformation is obtained whose major axis is about 40 μm and hence is actually negligible with respect to beat-length (a few millimiters). Since such size determines the minimum distance between two subsequent measurement points, it is clear that the invention affords a very high resolution.

The operation of the above-described device is immediately deduced from what precedes. The frame is initially moved to one end of its run, e.g. to the left end with reference to the drawing. Then, a predetermined weight is placed on pin 16 and the frame is advanced along the fiber by steps of the above-mentioned order of magnitude. The values of ratio R between amplitudes Ex, Ey of the field components and of phase difference $\phi$ supplied by polarimeter 7 at each step are stored in computing device 8. At a given fiber point of abscissa Z, for a force inducing in the fiber a birefringence effect resulting in a phase difference K between the two components, values R and $\phi$ are given by relations $$R(Z) = \frac{1 - \sin K \sin \delta \beta Z}{1 + \sin K \sin \delta \beta Z} \quad (2)$$

$$\phi(Z) = \arctg(\cos K \operatorname{tg} \delta\beta Z) + \delta\beta(L-Z) \quad (3)$$

where
L = fiber length
$\delta = 2\pi(n_x - n_y)$

In the particulare case of $K = \pi/2$, the above relations become $$R(Z) = \frac{1 - \sin \delta \beta Z}{1 + \sin \delta \beta Z} \quad (4)$$

$$\phi(Z) = \delta\beta(L-Z) \quad (5)$$

At the end of the run of roller 11 on the fiber, computing system 8 can calculate value $L_B$, which is given by the period of R and respectively by the distance between two points of abscissae z1, z2 where the values $\phi(z1)$, $\phi(z2)$ of $\phi$ are such that $\phi(z1) - \phi(z2) = 2\pi$. If the fiber length subjected to transverse stress is of the order of a few centimeters (and length $L_B$ of the order of the millimeter), it will comprise a high number of beat lengths and the value of $L_B$ supplied by computing system 8 will be an average of the measured values. This allows compensation of possible local inhomogeneities in fiber cladding.

If desired, to compensate also possible systematical errors of measurement instruments and mechanical defects, the measurement can be repeated from right to left or with different weights, and a mean value between the obtained values will be calculated again.

Figure 3:
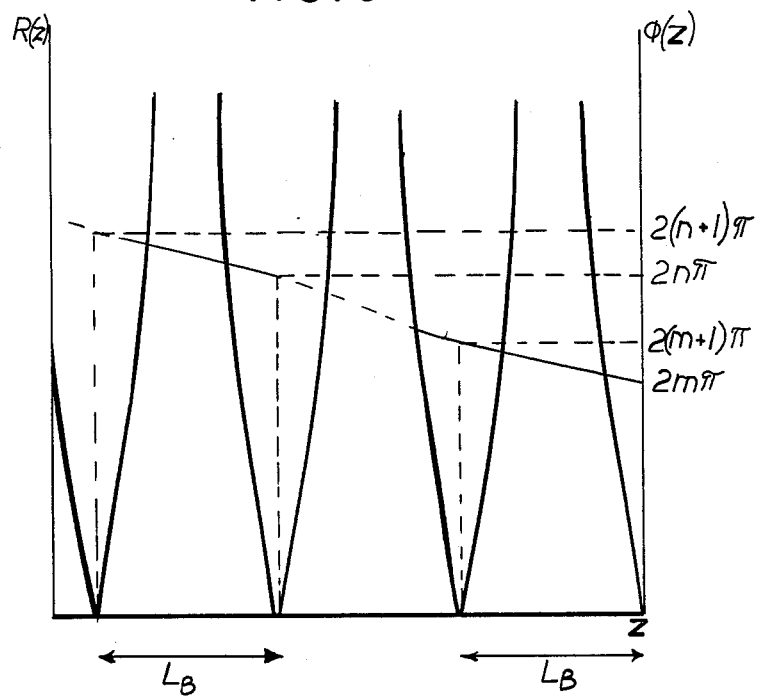
FIG. 3 shows the function of the amplitude ratio and the phase difference between the two electrical-field components versus the displacement of the force application point.

FIG. 3 shows R and $\phi$ versus Z, in the particular case of $K = \pi/2$.

Obtaining $L_B$ from two different quantities such as phase and amplitude ensures a greater noise immunity, since noises affecting the phase do not affect the field amplitude and vice versa; in addition, an interferometric polarimeter is a highly precise instrument in se. The structure described for the stressing device ensures a simple and accurate control of both the intensity and the direction of the applied force. In fact, an accurate construction of groove 10 ensures the complanarity between the figber axis and the groove edge and, in turn, the means controlling the displacement of the roller allow the force to be always kept exactly perpendicular to the axis.

Furthermore, the force need not be exerted on only one birefringence axis of the fiber and hence the prior detection of said axes is also unnecessary. Finally, interferometric measurement of the fields and not of the intensity presents all the advantages described for the polarimeter in the above-cited paper.

It is evident that variations and modifications are possible without going out of the scope of the invention. More particularly, the apparatus is easy to automate, since frame 13 can be driven by a motor controlled by computing system 8 so as to cause the displacements corresponding to the desired measurement step.

Figure 4:
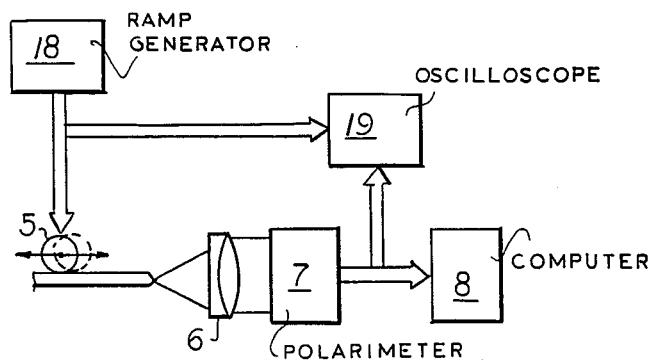
FIG. 4 is a partial view of a variant of the apparatus.

Lastly, a solution allowing real-time beat-length measurement can be envisaged. This solution is shown in FIG. 4: mechanical system 5 (and more particularly frame 13, FIG. 2) is connected with a reciprocating motor controlled by a linear-ramp periodical signal, with slow rise and fast decay, generated by a ramp generator 18.

Frame 13 moves slowly forward during rise time of the waveform, whereas it moves back quickly to the starting position during decay. In addition the forward stroke of frame 13 is to be greater than beat length to allow measurement repetition within a period of the applied signal.

The use of an oscilloscope 19 operating in x-y mode with channel x connected with ramp generator and channel y connected to outputs R or of polarimeter 7, allows real-time observation of the waveforms R(Z) and $\phi(Z)$ shown in FIG. 3 and, upon suitable calibration, determination of length $L_B$.

We claim:

1. A method of measuring polarization beat length in a highly birefringent single-mode optical fiber, said method comprising the steps of:
   (a) injecting a polarized radiation into one end of a highly birefringent single-mode optical fiber;
   (b) applying to said fiber a constant-intensity force perpendicular to an axis of the fiber;
   (c) displacing the force application point of the force applied in step (b) along said fiber while maintaining the intensity of the force constant;
   (d) analyzing polarization of radiation outgoing from an opposite end of said fiber while the force application point is displaced in step (c); and
   (e) determining from the polarization analysis of step (d) a beat length of the fiber from an amplitude ratio R(Z) between electrical field components along two orthogonal birefringence axes and from the relative phases $\phi(Z)$ between said components as the period of the function expressing the variation of the amplitude ratio with the displacement of the force application point measured by the spacing in said displacement of two points in which the relative phase varies by $2\pi$.

2. The method defined in claim 1 wherein the polarization analysis in step (d) is carried out by interferometry.

3. A device for measuring polarization beat length in a highly birefringent single-mode optical fiber, comprising:
   (a) means for injecting a polarized radiation into one end of a highly birefringent single-mode optical fiber;
   (b) means for applying to said fiber a constant-intensity force perpendicular to an axis of the fiber;
   (c) means for displacing the force application point of the force applied in step (b) along said fiber while maintaining the intensity of the force constant;
   (d) means for analyzing polarization of radiation outgoing from an opposite end of said fiber while the force application point is displaced in step (c); and
   (e) means for determining from the polarization analysis of step (d) a beat length of the fiber from an amplitude ratio R(Z) between electrical field components along two orthogonal birefringence axes and from the relative phases $\phi(Z)$ between said components as the period of the function expressing the variation of the amplitude ratio with the displacement of the force application point measured by the spacing in said displacement of two points in which the relative phase varies by $2\pi$.

4. The device defined in claim 3 wherein said means for analyzing comprises a polarimeter supplying values of the ratio between intensities of the components along the two fiber birefringence axes of the electrical field associated with the radiation injected into said fiber.

5. The device defined in claim 4 wherein said means for determining is a computer.

6. The device defined in claim 5 wherein said polarimeter is an interferometric polarimeter.

7. The device defined in claim 3 wherein said means for applying said force comprises a roller rotatable about a horizontal axis and bearing upon said fiber, a lever carrying said roller, a weight supported on said lever, and a frame to which said lever is fulcrummed.

8. The device defined in claim 7 wherein said means for displacing said force application point includes a housing receiving said frame, and means for displacing said frame along said fiber.

9. The device defined in claim 8 wherein said means for displacing said frame includes a motor slaved to said computer and coupled to said frame for stepping said frame along said fiber.

10. The device defined in claim 8 wherein said means for displacing said frame includes a reciprocating motor controlled by a generator of a slowly rising rapidly decaying periodic signal, said frame moving from a starting position during the ramp rise time and returning to said position during decay of the periodic signal.

11. The device defined in claim 10, further comprising an oscilloscope operating in x-y mode, the ramp signal and signals from said polarimeter being applied, respectively, to x-axis and y-axis inputs of said oscilloscope.

* * * * *